(12) United States Patent
Sanchez et al.

(10) Patent No.: US 11,182,218 B2
(45) Date of Patent: Nov. 23, 2021

(54) METHOD AND APPARATUS FOR ORCHESTRATING CROSS-FAAS PROVIDER FUNCTIONS DECLARATIVELY

(71) Applicant: VMware, Inc., Palo Alto, CA (US)

(72) Inventors: Sergio Sanchez, Sofia (BG); Radostin Georgiev, Sofia (BG); Alek Boninski, Sofia (BG); Angel Ivanov, Sofia (BG); Tina Nakova, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 54 days.

(21) Appl. No.: 16/731,652

(22) Filed: Dec. 31, 2019

(65) Prior Publication Data

US 2021/0200596 A1 Jul. 1, 2021

(51) Int. Cl.
*G06F 9/50* (2006.01)

(52) U.S. Cl.
CPC .......... *G06F 9/5055* (2013.01); *G06F 9/5072* (2013.01)

(58) Field of Classification Search
CPC ..... G06F 9/5055; G06F 9/5072; G06F 9/5038
See application file for complete search history.

(56) References Cited

U.S. PATENT DOCUMENTS

| | | | | |
|---|---|---|---|---|
| 10,678,522 | B1 * | 6/2020 | Yerramreddy | G06F 8/65 |
| 10,884,732 | B1 * | 1/2021 | Zolotow | G06F 8/76 |
| 10,958,711 | B1 * | 3/2021 | Lindner | H04L 67/1076 |
| 2013/0227137 | A1 * | 8/2013 | Damola | G06F 9/5072 |
| | | | | 709/224 |
| 2014/0278808 | A1 * | 9/2014 | Iyoob | G06Q 30/0206 |
| | | | | 705/7.35 |
| 2014/0280848 | A1 * | 9/2014 | Modh | H04L 67/10 |
| | | | | 709/223 |
| 2015/0304231 | A1 * | 10/2015 | Gupte | H04L 47/70 |
| | | | | 709/226 |
| 2018/0227388 | A1 * | 8/2018 | Kuo | H04L 67/327 |
| 2018/0324251 | A1 * | 11/2018 | Padmanabh | H04L 67/306 |
| 2019/0004871 | A1 * | 1/2019 | Sukhomlinov | G06F 9/5038 |
| 2020/0097475 | A1 * | 3/2020 | Tran | G06Q 30/01 |
| 2020/0218579 | A1 * | 7/2020 | D M | H04L 41/5054 |

OTHER PUBLICATIONS

AWS, "AWS Step Functions", https://aws.amazon.com/step-functions/, retrieved Aug. 31, 2020, 11 pgs.
Fisher, Mark et al. "Spring Cloud Function Reference Documentation", https://cloud.spring.io/spring-cloud-function/reference/html/, retrieved Aug. 31, 2020, 1pg.

* cited by examiner

*Primary Examiner* — Javier O Guzman
(74) *Attorney, Agent, or Firm* — Loza & Loza, LLP

(57) ABSTRACT

System and computer-implemented method for executing a workflow definition with a set of function definitions having code executable with at least one cloud services provider in a plurality of cloud services providers involve reception of a request to execute a function definition from the workflow definition and a determination of whether code contained in the function definition is only executable at that particular cloud services provider. A provider function at the cloud services provider is invoked using the function definition and an execute command for the provider function is transmitted for the provider function.

20 Claims, 12 Drawing Sheets

Flow Definition (Conditional)

```
version: "1"
flow:
  flow_start:
    next: node1
  node1:
    next: condition1
    actionId: {node1 action id}
  condition1:
    switch:
      ${x >= 0}: node2
      ${x < 0}: node3
  node2:
    next: node4
    actionId: {node2 action id}
  node3:
    next: node4
    actionId: {node3 action id}
  node4:
    next: flow_end
    actionId: {node4 action id}
```

FIG. 7

```
Flow Definition (Fork/Join)
version: "1"
flow:
  flow_start: next:
    node1
  node1:
    next: fork1
    actionId: {node1 action id}
  fork1:
    fork:
      next:
        - node2
        - node3
  node2:
    next: join1
    actionId: {node2 action id}
  node3:
    next: join1
    actionId: {node3 action id}
  join1:
    join:
      next: node4
      type: all
  node4:
    next: flow_end
    actionId: {node4 action id}
```

FIG. 8

```
Flow Definition (Error Handling)
version: "1" flow:
  flow_start:
    next: firstAction
  firstAction:
    actionId: {first action id}
    next: lastAction
  lastAction:
    actionId: {last action id}
    next: flow_end
  onError:
    actionId: {error handler action id}
```

*FIG. 9*

METHOD AND APPARATUS FOR ORCHESTRATING CROSS-FAAS PROVIDER FUNCTIONS DECLARATIVELY

BACKGROUND

Cloud computing and cloud storage systems are used in cloud architectures by cloud computing providers, which may also be referred to as cloud services providers, to offer various services. Examples of cloud architectures include the VMware Cloud architecture software, Amazon EC2™ web service, and OpenStack™ open source cloud computing service. One such cloud service that may be offered is an infrastructure as a service (IaaS) cloud service. IaaS cloud service is a type of cloud service that provides access to physical and/or virtual resources in a cloud environment. These cloud services provide a tenant application programming interface (API) that supports operations for manipulating IaaS constructs, such as virtual computing instances (VCIs) (e.g., virtual machines (VMs)), and logical networks.

In addition to offering IaaS cloud services, cloud computing providers may also offer function as a service (FaaS) cloud services. Examples of FaaS cloud services include AWS Lambda provided by Amazon Web Services, Inc., GCP (Google Cloud Platform) Cloud Functions provided by Google LLC, and Azure Functions offered by Microsoft Corporation. An FaaS cloud service is a computing service that provides a platform allowing development, deployment, and management of application functionalities without the complexity of building and maintaining infrastructure typically associated therewith. The cloud computing provider performs all administration of computing resources, including server and operating system maintenance. In addition, the cloud computing provider offers capacity provisioning and scaling, code monitoring, and logging. Use of FaaS cloud services provides cost savings because a user is charged based only on computing resources used. For example, cost is not incurred when code is not running. In other words, FaaS cloud services provide users the ability to run code efficiently, without provisioning or managing servers. Hence, applications that are built using FaaS cloud services are commonly referred to as "serverless applications." Each serverless application may include one or more code snippets referred to as "serverless functions." In general, a serverless function is described by a serverless function definition that includes program code and attributes for execution of the program code (e.g., library and other dependencies) for the serverless function.

Of course, the services described above may be provided for a private cloud that includes one or more customer data centers (referred to herein as "on-premise data centers"). The services may also be provided for a public cloud that includes a multi-tenant cloud architecture providing IaaS cloud services. The services may further be provided for in a hybrid cloud system. A hybrid cloud system aggregates the resource capability from both private and public clouds to facilitate creation, deployment, maintenance, and utilization of application with minimal effort of access to those capabilities. In other words, a hybrid cloud system abstracts private, on-premises, and public cloud resources and presents them as being available in one continuous, hybrid cloud. Customers can then deploy applications over the resources offered by the hybrid cloud to take advantage of scaling and flexibility.

Cloud computing providers that offer FaaS cloud services may provide their own approaches to define and orchestrate (e.g., define and invoke) sets of functions (serverless functions). These approaches are often proprietary because they are concerned only with the platform of the specific cloud computing provider. Thus, even where a cloud computing provider offers orchestration capabilities, they are limited to functions being defined and executed in their own services. In other words, users are not able to use the orchestration capabilities of cloud computing provider A to orchestrate a set of functions distributed in cloud computing providers B and C. Even worse, some cloud computing providers do not offer orchestration capabilities at all.

Currently, if a user wants to create a workflow that orchestrates different serverless functions from different cloud computing providers, the only option available to the user is to code and run the workflow independently from cloud computing providers. An example of this could be, considering a user working with three different FaaS providers (Provider A, Provider B, and Provider C):

1. The user writes a serverless function X and deploys it at the Provider A.
2. Same for a function Y at the provider B.
3. And same for a function Z at the provider C.
4. The user has to write a custom script or program that calls the previously created (and deployed) functions and orchestrates them in a desired way. The user must implement different orchestration constructs that the user wants to include in the workflow, like fork, join, conditions, etc.
5. The user then must be able to run the custom script/program somewhere.

This may be locally (e.g., in the user's server), or maybe as a yet another serverless function deployed somewhere that the user has to maintain.

Issues with the current approach include:
- The process not being user-friendly because everything is code-oriented.
- Difficulty of reusability because every time a new workflow needs to be created, the whole coding exercise needs to start from scratch.
- The user is still ultimately responsible for managing the execution of the workflow and maintaining infrastructure to support orchestration.

With increasing adaptation of cloud computing and cloud storage by enterprises, efficient and low-maintenance orchestration of execution of serverless functions across multiple cloud computing providers is never more important than it is now.

SUMMARY

System and computer-implemented method for executing a workflow definition with a set of function definitions having code executable with at least one cloud services provider in a plurality of cloud services providers involve reception of a request to execute a function definition from the workflow definition and a determination of whether code contained in the function definition is only executable at that particular cloud services provider. A provider function at the cloud services provider is invoked using the function definition and an execute command for the provider function is transmitted for the provider function.

A computer-implemented method in a cloud architecture for executing a workflow definition including a set of function definitions having code executable with at least one cloud services provider in a plurality of cloud services providers in accordance with an embodiment of the invention includes receiving a request to execute a function definition from the workflow definition; and determining whether the function definition comprises code only executable with a specific cloud services provider in the plurality of cloud services providers. The method also includes invoking a provider function at the specific cloud services provider using the function definition based on the determination; and transmitting an execute command for the provider function. In some embodiments, the steps of this method are performed when program instructions contained in a computer-readable storage medium are executed by one or more processors.

A system in a cloud architecture for executing a workflow definition in a cloud architecture, where the workflow definition includes a set of function definitions having code executable with at least one cloud services provider in a plurality of cloud services providers, configured in accordance with another embodiment of the invention includes memory and one or more processors configured to receive a request to execute a function definition from the workflow definition; determine whether the function definition comprises code only executable with a specific cloud services provider in the plurality of cloud services providers; invoke a provider function at the specific cloud services provider using the function definition based on the determination; and transmit an execute command for the provider function.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 7 is a diagram of an example flow definition that includes a conditional operation, configured in accordance with various aspects of the invention, that may be used to orchestrate cross-FaaS provider functions.

FIG. 8 is a diagram of an example flow definition that provides a fork/join operation, configured in accordance with various aspects of the invention, that may be used to orchestrate cross-FaaS provider functions.

FIG. 9 is a diagram of an example flow definition that provide error handling, configured in accordance with various aspects of the invention, that may be used to orchestrate cross-FaaS provider functions.

Throughout the description, similar reference numbers may be used to identify similar elements.

DETAILED DESCRIPTION

Figure 1:
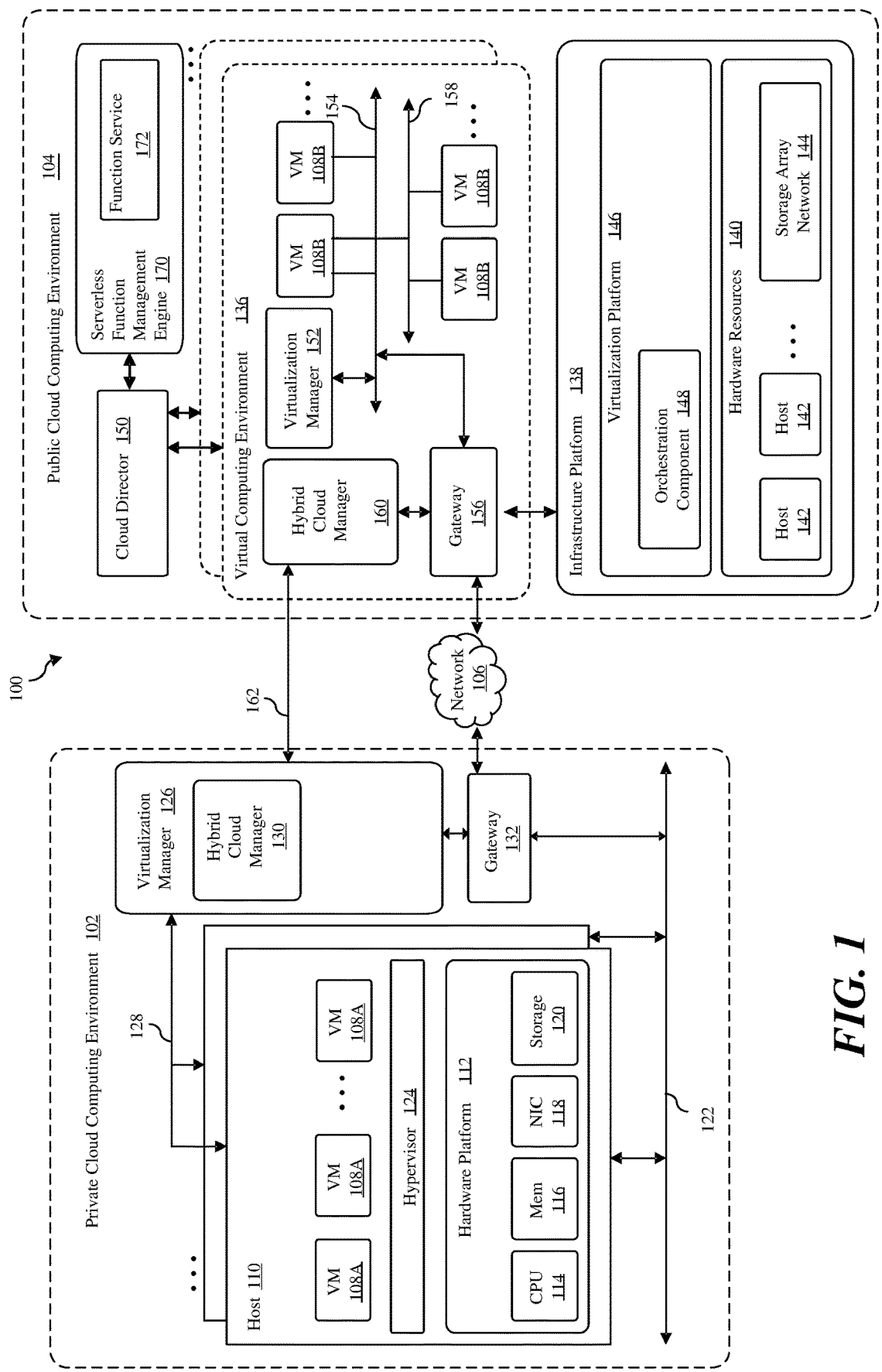
FIG. 1 is a block diagram of a hybrid cloud system that may be used to describe a method and apparatus for orchestrating cross-FaaS provider functions declaratively configured in accordance with various aspects of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," "one aspect," "an aspect," "various aspects," or similar language means that a particular feature, structure, or characteristic described in connection with the indicated embodiment is included in at least one embodiment of the present invention. Thus, the phrases "in one embodiment," "in an embodiment," "in one aspect," "in an aspect," "in various aspects," and similar language throughout this specification may, but do not necessarily, all refer to the same embodiment.

The following terms will be used in this description. Those skilled in the art would understand that the definitions are not meant to be limiting but are to be used to further provide understanding to the disclosure contained herein.

As used herein, the terms "objects" or "computing objects" may refer to applications, services, hosts, components, sub-components, or any other entity that may communicate with other entities in the cloud architecture, and for which a proxy may be used. These may include hosts and appliances implemented using virtualization technologies provided by VMware, Inc., including VCIs created using VMware ESXi™-based hypervisors. However, objects may be implemented using any other virtualization technologies, including Xen®, Microsoft Hyper-V® and/or Docker virtualization technologies.

FaaS—Function-as-a-service.

Serverless function—"Service traditional" function (such as a small piece of code in some particular language) that is deployed and executed in an FaaS provider.

Serverless function definition ("function definition")—Definition of a serverless function in a service. The function definition may include some attributes (e.g., name, description, runtime, input variables, output variables, memory constraint and so on). Mainly, the Function Definition specifies the actual program code that the user wants to execute.

Serverless function execution ("function run")—Instance of a particular function definition at runtime. The instance is a "clone" of its function Definition but with actual values for input and output variables to be used for the Function Run.

FaaS Provider ("cloud computing provider," "cloud service provider," "cloud provider," "code execution service," or "provider")—Entity that executes code from the function definitions created by the user. Example of providers include AWS Lambdas, Azure Functions, or GCP Cloud Functions.

Serverless function provider function ("FaaS provider function")—Actual representation of a function run in the provider with all the code being executed.

In accordance with various aspects of the disclosed invention, orchestration of serverless functions as cross-cloud services (cross-FaaS) provider functions declaratively may be provided by a serverless function management engine providing a function service. The provider functions may be deployed as part of a workflow execution, such as an automation workflow execution. The workflow may be defined in a flow definition, and the execution of a workflow based on the flow definition may be referred to as a "flow run." Similarly, execution of a particular serverless function may be referred to as a "function run." The serverless functions used in a flow definition may be specific to a particular cloud services provider or agnostic to multiple cloud services providers. In other words, each serverless function may contain code executable only at a specific cloud services provider or code executable at multiple/any cloud services providers.

In one aspect of the disclosure, users may interact with the function service to manage flow definitions, flow runs, serverless function definitions, and function runs. For example, the function service may store flow definitions and function definitions created by the user and also allow the user to trigger flow and function runs. The function service also allows the user to monitor progress of all flow and function runs.

Turning now to FIG. 1, a block diagram of a hybrid cloud system 100, which may also be referred to as a "cloud architecture," in accordance with an embodiment of the invention is shown. The hybrid cloud system 100 includes at least one private cloud computing environment 102 and at least one public cloud computing environment 104 that are connected via a network 106. The hybrid cloud system 100 is configured to provide a common platform for managing and executing workloads seamlessly between the private and public cloud computing environments. In one embodiment, the private cloud computing environment 102 may be controlled and administrated by a particular enterprise or business organization, while the public cloud computing environment 104 may be operated by a cloud computing service provider and exposed as a service available to account holders, such as the particular enterprise in addition to other enterprises. In some embodiments, the private cloud computing environment 102 may be a private or on-premise data center.

The private cloud computing environment 102 and public cloud computing environment 104 of the hybrid cloud system 100 include computing and/or storage infrastructures to support a number of virtual computing instances 108A and 108B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

Continuing to refer to FIG. 1, the private cloud computing environment 102 of the hybrid cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions such as, for example, executable instructions that may be used to perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a network 122 within the private cloud computing environment. The network interface 118 may be one or more network adapters, also referred to as a Network Interface Card (NIC). The storage system 120 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host.

Each host 110 may be configured to provide a virtualization layer that abstracts processor, memory, storage, and networking resources of the hardware platform 112 into the virtual computing instances, e.g., the virtual machines 108A, that run concurrently on the same host. The virtual machines run on top of a software interface layer, which is referred to herein as a hypervisor 124, that enables sharing of the hardware resources of the host by the virtual machines. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host may include other virtualization software platforms to support those virtual computing instances, such as Docker virtualization platform to support software containers.

The private cloud computing environment 102 includes a virtualization manager 126 that communicates with the hosts 110 via a management network 128. In one embodiment, the virtualization manager 126 is a computer program that resides and executes in a computer system, such as one of the hosts, or in a virtual computing instance, such as one of the virtual machines 108A running on the hosts. One example of the virtualization manager 126 is the VMware vCenter Server® product made available from VMware, Inc. The virtualization manager 126 is configured to carry out administrative tasks for the private cloud computing environment, including managing the hosts, managing the VMs running within each host, provisioning VMs, migrating VMs from one host to another host, and load balancing between the hosts.

The virtualization manager 126 includes a hybrid cloud manager 130. In general, the hybrid cloud manager 130 is responsible for managing and integrating computing resources provided by the private cloud computing environment 102 with computing resources provided by the public cloud computing environment 104 to form a unified "hybrid" computing platform. The hybrid cloud manager 130 may further be configured to deploy virtual computing instances, e.g., virtual machines 108A, in the private cloud computing environment; transfer VMs from the private cloud computing environment to the public cloud computing environment; and perform other "cross-cloud" administrative tasks.

The hybrid cloud manager 130 is configured to control network traffic into the network 106 via a gateway device 132, which may be implemented as a virtual appliance. The gateway device 132 is configured to provide the virtual machines 108A and other devices in the private cloud computing environment 102 with connectivity to external devices via the network 106. The gateway device 132 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

In one implementation, the hybrid cloud manager 130 is a module or plug-in to the virtualization manager 126, although other implementations may be used, such as a separate computer program executing in any computer system or running in a virtual machine in one of the hosts. One example of the hybrid cloud manager 130 is the VMware® HCX™ product made available from VMware, Inc.

The public cloud computing environment 104 of the hybrid cloud system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. The public cloud computing environment includes an infrastructure platform 138 upon which the virtual computing environments can be executed. In the particular embodiment of FIG. 1, the infrastructure platform includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the virtual machines 108B across the hosts 142. The virtualization platform may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running, on the hosts 142, VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director 150 may be accessible to users via a REST (Representational State Transfer) API (Application Programming Interface) or any other client-server communication protocol. The cloud director 150 may authenticate connection attempts from the enterprise using credentials issued by the cloud computing provider. The cloud director 150 receives provisioning requests submitted (e.g., via REST API calls) and may propagate such requests to the orchestration component 148 to instantiate the requested virtual machines (e.g., the virtual machines 108B). One example of the cloud director is the VMware vCloud Director® product from VMware, Inc. The public cloud computing environment 104 may be VMware cloud (VMC) on Amazon Web Services (AWS).

In one embodiment, at least some of the virtual computing environments 136 may be configured as virtual data centers. Each virtual computing environment includes one or more virtual computing instances, such as the virtual machines 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one networking gateway device 156, as well as one or more isolated internal networks 158 not connected to the gateway device 156. The gateway device 156, which may be a virtual appliance, is configured to provide the virtual machines 108B and other components in the virtual computing environment 136 with connectivity to external devices, such as components in the private cloud computing environment 102 via the network 106. The gateway device 156 operates in a similar manner as the gateway device 132 in the private cloud computing environment.

In one embodiment, each virtual computing environments 136 includes a hybrid cloud manager 160 configured to communicate with the corresponding hybrid cloud manager 130 in the private cloud computing environment 102 to enable a common virtualized computing platform between the private and public cloud computing environments. The hybrid cloud manager 160 may communicate with the hybrid cloud manager 130 using Internet-based traffic via a VPN tunnel established between the gateways 132 and 156, or alternatively, using a direct connection 162. The hybrid cloud manager 160 and the corresponding hybrid cloud manager 130 facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration.

Referring still to FIG. 1, a serverless function management engine 170 configured in accordance with various aspects of the invention that provides cross-FaaS provider function orchestration as well as handle requests from users to interact with deployed serverless functions is illustrated. For example, the serverless function management engine 170 may be used to provide an interface to determine status of deployment of serverless function definitions and execution of serverless functions. The serverless function management engine 170 may also be used to manage the flow definitions and flow runs associated with deployment of serverless function definitions and execution of serverless functions, including the provider functions at FaaS providers selected to execute the serverless function. In one embodiment, the serverless function management engine 170 may communicate with the cloud director 150 to implement automation and management of hybrid cloud computing resources, which includes on-premise virtual computing resources as well.

Although a specific location of the serverless function management engine 170 is provided as an example, those skilled in the art would understand that the functionality described herein for orchestrating cross-FaaS provider functions by the serverless function management engine 170 may be provided as a part of one or more other components, depending on the implementation. Thus, the placement of the serverless function management engine 170 as described herein is provided as an example and is not intended to be limiting.

In one aspect of the disclosed invention, a function service 172 in the serverless function management engine 170 may be used to provide cross-FaaS provider function orchestration, as described herein, where a workflow may involve different FaaS providers. In general, the function services 172 manages flow runs, including execution of function runs on multiple FaaS providers as a part thereof. The function service 172 also provides users with the ability to create and use provider-agnostic serverless function definitions with any FaaS provider, either as a function run or as part of a flow definition.

Figure 2:
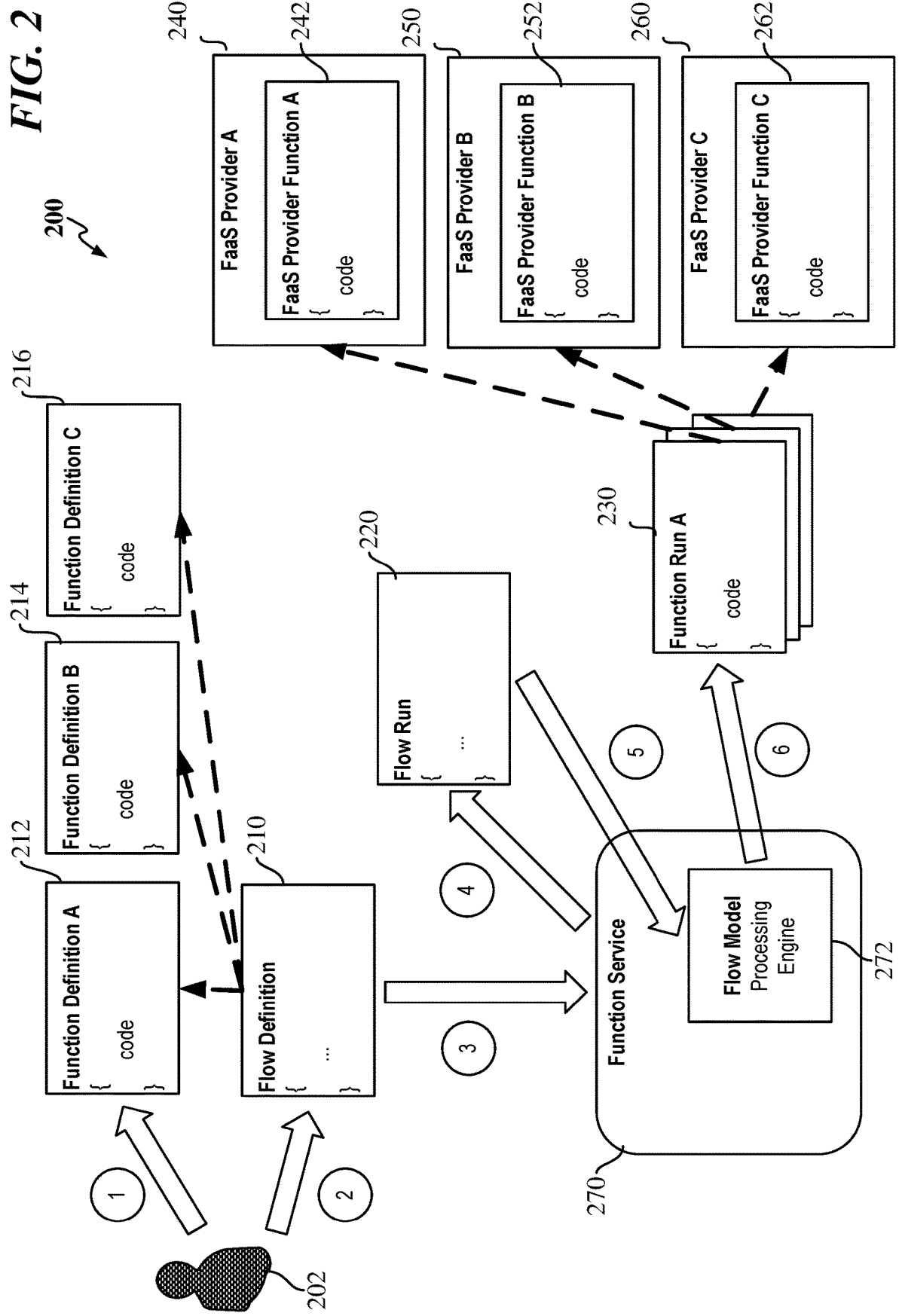
FIG. 2 is a block diagram that provides an overview for orchestrating cross-FaaS provider functions declaratively in accordance with various aspects of the invention.
Figure 3:
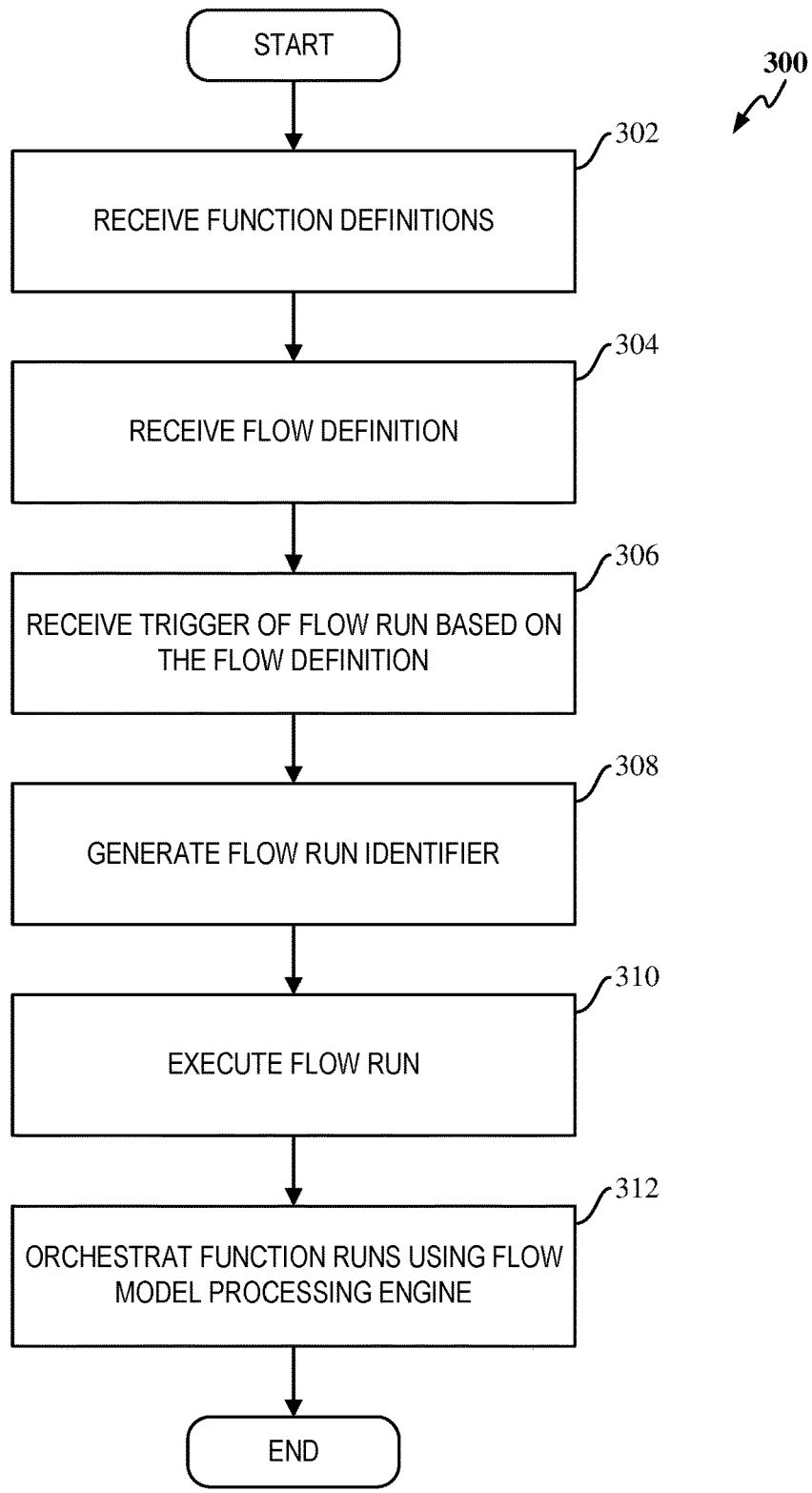
FIG. 3 is a flow diagram of a cross-FaaS provider function orchestration process configured in accordance with various aspects of the invention from FIG. 2.

FIG. 2 illustrates a cross-FaaS provider function orchestration overview 200 for operation of the function service 172 as configured in accordance with various aspects of the invention. In describing the cross-FaaS provider function orchestration overview 200, reference will be made to FIG. 3 that illustrates a cross-FaaS provider function orchestration process 300.

At step 302, function definitions with the code to be executed that have been created by a user 202 is received by a function service such as the function service 172, which is illustrated as a function service 270. As illustrated, the function definitions include a function definition A 212, a function definition B 214, and a function definition C 216. A function definition configured in accordance with an embodiment of the present invention may include a provider designation variable to indicate specific FaaS providers on which the code contained in the function definition may be executed. In addition, as further described herein, required execution of a function at a particular FaaS provider may be specified in the function definition.

At step 304, a flow definition 210 that may be used to orchestrate the execution of function definitions, which also has been created by the user 202, is received by the function service 270.

At step 306, the function service 270 receives a trigger by the user 202 for a flow run 220 for the flow definition 210 received at step 304.

At step 308, the function service 270 may generate a flow run identifier for the flow run 220. The flow run identifier may be provided to the user to allow the user to monitor the overall execution of the flow run and/or determine the final outcome.

At step 310, the flow run 220 may be executed by the function service 270. In one aspect of the invention, the function service 270 handles execution of the flow run 220 by orchestrating individual execution of function definitions specified in the flow definition using a flow model processing engine such as a flow model processing engine 272 illustrated in FIG. 2. The flow model processing engine is tasked with interacting with each FaaS provider in accordance with their proprietary interface, such as through an API, to allow execution of function runs. In addition to orchestrating function runs across different FaaS providers, the flow model processing engine also provides a uniform interface to allow control and management of different FaaS providers without the user having to create customized code for each FaaS provider.

At step 312, the flow model processing engine 272 may trigger individual function runs 230 as part of the flow run. In the example provided herein, the flow definition 210 includes use of the function definition A 212, the function definition B 214, and the function definition C 216. Thus, the flow model processing engine 272 will trigger function runs at appropriate junctures of the flow run 220. In one aspect of the invention, each function run may end up in a different FaaS provider. In other words, the flow model processing engine 272 selects a FaaS provider for a particular function run that may be different from the FaaS provider chosen for another function run.

Figure 4:
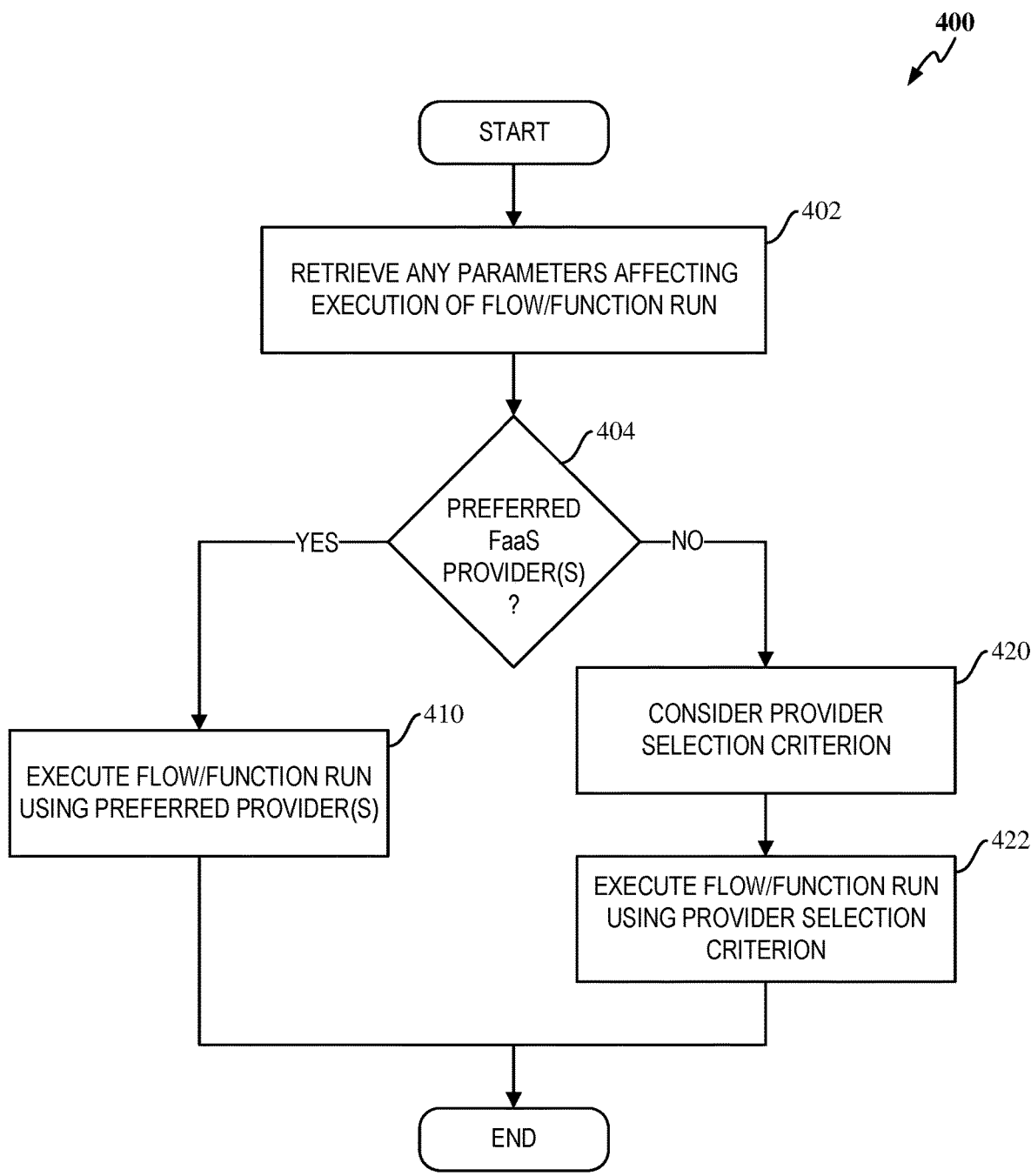
FIG. 4 is a flow diagram of an FaaS provider selection process configured in accordance with various aspects of the invention that may be used in the cross-FaaS provider function orchestration process of FIG. 3.

Turning to FIG. 4, a FaaS provider selection process 400 for determining a FaaS provider at which the orchestrated function runs may be executed by the flow model processing engine 272 is illustrated.

At step 402, the flow model processing engine 272 may retrieve any parameters that may affect execution of the flow run and the function runs that are in the flow run. In one aspect of the disclosure, the flow definition may include an external restriction parameter (one or more "external restrictions") to specify a FaaS provider to be used for executing any or all of the function runs in the flow run. Use of a particular FaaS provider may be guaranteed by specifying the external restriction parameter. Thus, when a flow run is triggered in the function service and an external restriction parameter identifying a preferred FaaS provider is retrieved by the flow model processing engine, that preferred FaaS provider will be selected. An external restriction parameter use example may be when only a particular FaaS provider can provide a particular service or function. For example, if either the flow run or model run requires access to a database service such as that only provided by AWS Aurora, then that function needs to be deployed and executed in AWS Lambda. In another aspect of the disclosed approach, each function definition may also include an external restriction parameter to specify that a particular FaaS provider should be used during the execution of the function run. Thus, the flow model processing engine may guarantee location of execution during flow runs at either a flow or function run level. In still yet another aspect of the disclosed approach, the external restriction parameter may be used to specify a prioritization of multiple FaaS providers at a flow and/or function run level. Once all parameters affecting FaaS provider selection are retrieved, operation continues with step 404.

At step 404, it is determined if there are any parameters affecting FaaS provider selection that have been retrieved. If one or more parameters affecting FaaS provider selection has been retrieved, then operation continues with step 410. However, if no parameters affecting FaaS provider selection exists, then operation continues with step 420.

At step 410, where any parameters affecting FaaS provider selection exists and have been retrieved, the flow model processing engine 272 will operate under those constraints. For example, if a FaaS provider has been specified in an external restriction parameter at a flow run level, then the flow model processing engine 272 will execute the flow run and each function run therein at the specified FaaS provider. If there is no FaaS provider that is specified at the flow run level, but one or more function definitions contains an external restriction parameter specifying a FaaS provider, then the flow model processing engine 272 will execute each function run in accordance with the FaaS provider selection that has been retrieved at step 402.

At step 420, where no parameters affecting FaaS provider selection exists, selection of a FaaS provider may be made for each function run based on one or more criteria. These criteria may include cost of utilizing the FaaS provider, available FaaS resources, service-level requirements, geographic location, or other considerations. After all relevant criteria have been considered, operation continues with step 422.

At step 422, the flow model processing engine 272 may execute the flow run and each individual function run contained therein using one or more FaaS providers chosen based on the criteria considered at the previous step 420. In one aspect of the disclosed approach, the selection determination based on considered criteria may be made immediately before each function run is to be executed. This will allow a more timely and dynamic allocation and use of resources.

Figure 5:
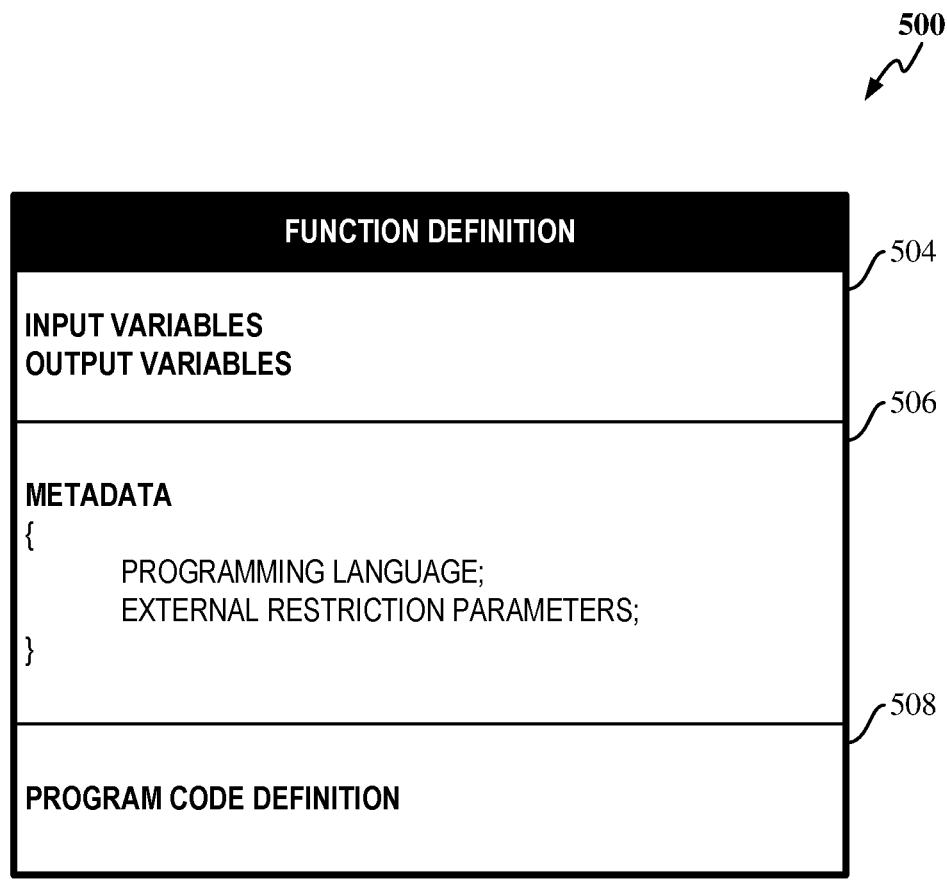
FIG. 5 is a diagram of a serverless function definition configured in accordance with various aspects of the invention.
Figure 6:
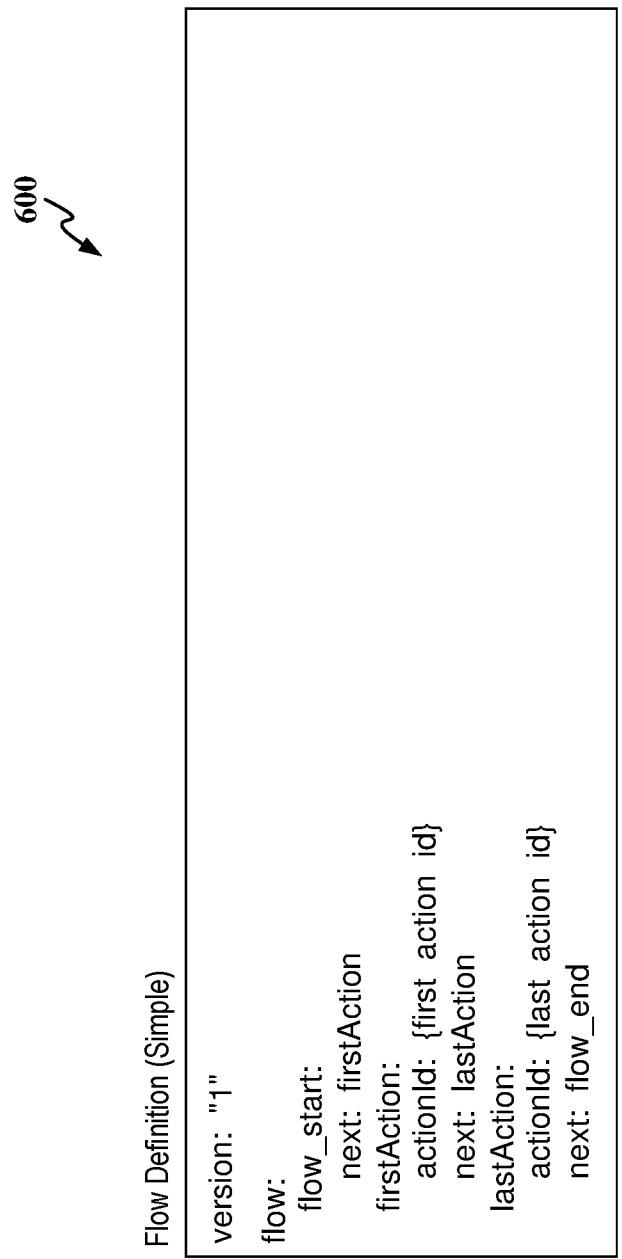
FIG. 6 is a diagram of an example flow definition for a simple flow, configured in accordance with various aspects of the invention, that may be used to orchestrate cross-FaaS provider functions.

FIG. 5 illustrates a serverless function definition 500 configured in accordance with various aspects of the invention that includes input/output variables 504 that may be used when program code 508 is executed.

The serverless function definition 500 may also include metadata 506 that indicates on which platforms the program code 508 may be executed. The metadata 506 may indicate whether the program code 508 is platform agnostic such that the program code 508 may be executed at any FaaS provider. The metadata 506 may also indicate that the program code 508 requires execution at a particular FaaS provider. For example, program code that provides functions as e-mailing users about deployment status for a virtual machine may be platform agnostic, while program code that contains database query commands that is specific to a FaaS platform such as AWS or that utilizes AWS-specific API would be cloud provider specific. The metadata 506 may further include other information necessary to execute a function run using the serverless function definition 500, as further described herein.

In the example shown in FIG. 2, the flow model processing engine 272 may execute code provided in the function definition A 212 at a FaaS provider A 240, the function definition B 214 at a FaaS provider B 250, and the function definition C 216 at a FaaS provider C 260. Specifically, and using the function definition A 212 as an example, the flow model processing engine 272 will execute the function run 230 for the function definition A 212 to invoke a FaaS provider function A 242 at the FaaS provider A 240.

Before a provider function may be invoked at a FaaS provider, the provider function must be instantiated. In one aspect of the disclosed approach, similar to the flow run identifier, the provider function at the specific FaaS provider may be referenced by an identifier, referred to as a "provider function identifier" that is unique to that provider function. The provider function identifier may include information necessary to determine a status of execution of the provider function. The status may include whether the provider function has been instantiated. Thus, the flow model processing engine 272 may determine whether a provider function needs to be instantiated before invocation based on the information. Again using the function definition A 212 as an example, when the function definition A 212 is first provided to the FaaS provider A 240 and instantiated as the FaaS provider function A 242, the FaaS provider A 240 will assign a unique identifier for the FaaS provider function A 242. The flow model processing engine 272 will receive this identifier as a provider function identifier for the FaaS provider function A 242 and may use it to determine status information about the FaaS provider function A 242.

Similar to the description of the FaaS provider function A 242, the flow model processing engine 272 may instantiate a FaaS provider function B 252 at the FaaS provider B 250 using the function definition B 214, and a FaaS provider function C 262 at the FaaS provider C 260 using the function definition C 216.

FIGS. 6-10 provide examples of flow definitions in which various aspects of the cross-FaaS provider function orchestration approach described herein may be implemented. For example, FIG. 6 includes an example of a simple flow definition 600 that includes a "flow start" label to execute a "firstAction" and a "lastAction." Each action includes an associated action identifier ("actionId") variable to store the identity of a serverless function execution so the serverless function may be referenced and interacted with. A "flow_end" label indicates the end of the flow defined by the simple flow definition 600.

FIG. 7 includes an example of a flow definition 700 that provides for conditional execution of serverless functions where, after "node1", the flow definition may continue with "node2" or "node3" depending on a result of examining a variable "X" during "condition1". Both node2 and node3 call on "node4", which ends the flow defined in the flow definition 700.

FIG. 8 includes an example of a flow definition 800 that includes a fork/join flow example where, after "node1", a fork ("fork1") occurs to start "node2" and "node3". Both node2 and node3 are joined by "joint" that then proceeds with "node4" to end the flow defined in the flow definition 800.

FIG. 9 includes an example of a flow definition 900 that includes an error handling flow example where an "onError" label is provided with an associated action to be called if an error occurs.

As described, various aspects of the disclosed approach provide for implementing a flow definition that may be used to orchestrate serverless functions deployed across different FaaS providers. The approach is agnostic and may work with any FaaS provider, including ones that do not offer any orchestration ability of their own. Various aspects of the disclosed approach also provide users ability to create provider-agnostic functions so that users can create a serverless function that may be executed at any FaaS provider.

The current process for implementing serverless functions is as follows:

1. The user writes a serverless function in a preferred language (e.g., Python, NodeJS, Java, etc.).
2. The user chooses a FaaS provider and checks all the requirements needed to "translate" the user's serverless function to match the serverless function definition of the FaaS provider.
3. The user manually adapts and packages the serverless function according those requirements.
4. The user deploys the serverless function in the FaaS provider, where it is then ready to be invoked.

Although the described process seems straightforward, it is not very flexible nor adaptable and does not allow for a "write once, run anywhere" approach. For example, if the user wants the serverless function to be available in a different FaaS provider, then the user has to start over at step 2. This is because each FaaS provider adopts their own proprietary approach to define and invoke serverless functions. Differences may involve how a user may submit serverless function definitions (e.g., accepted only via "plain text" or via a ZIP file bundle with specific format); naming conventions and formats (e.g., submitted serverless function entry point must be named in a particular way with a particular number and names of parameters); and different number of settings related to the serverless function executions (e.g., timeouts, CPU/memory restrictions, dependencies, etc.).

In accordance with one aspect of the disclosed approach, provider-specific function wrappers with a particular implementation for FaaS and serverless scenarios are provided. These provider-specific function wrappers are automatically managed and handled so that users may implement serverless functions without concern of how the serverless functions will be executed. Thus, users do not have to be concerned with customizing their serverless function definitions to a particular FaaS provider.

Figure 10:
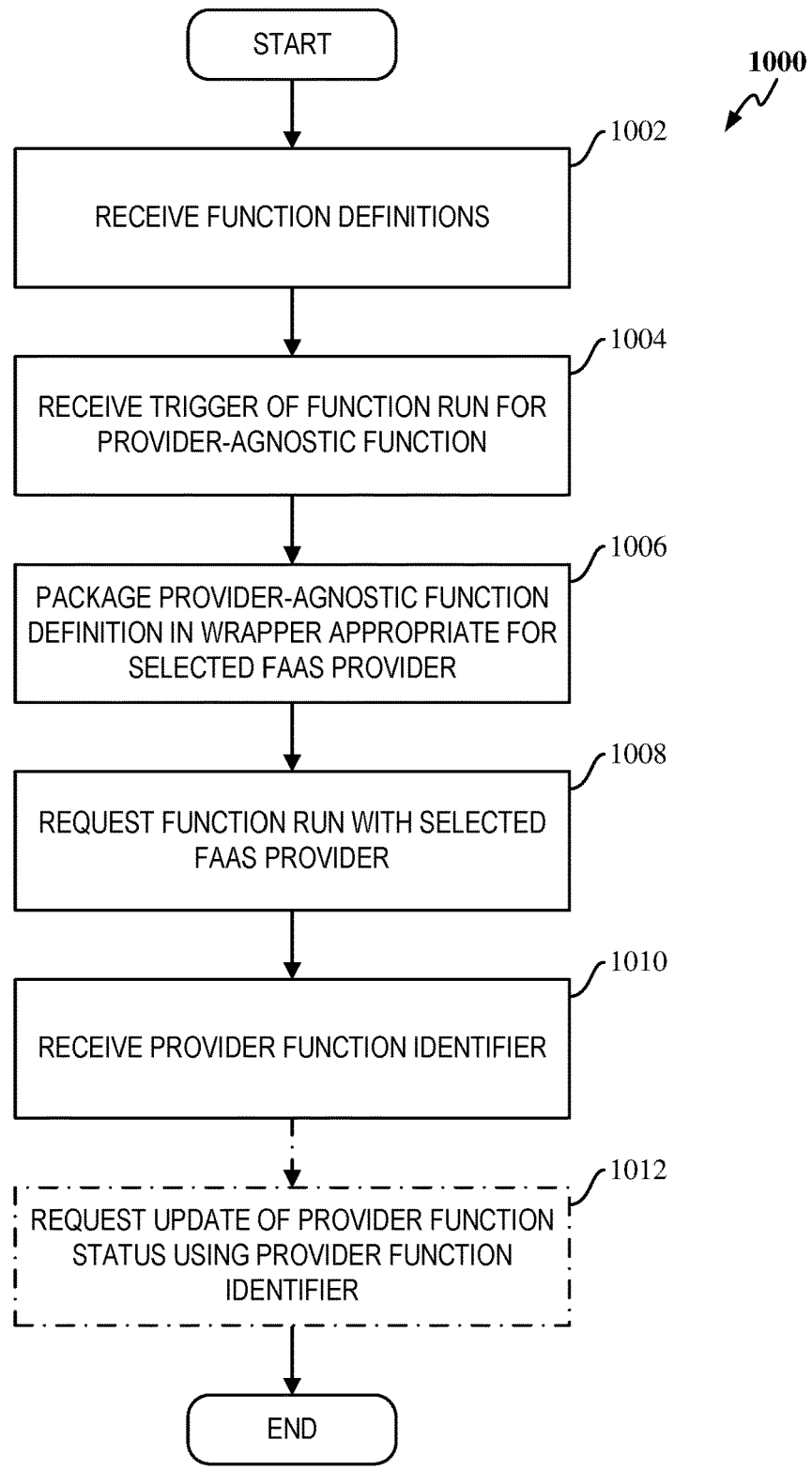
FIG. 10 is a flow diagram of a provider-agnostic function handling process, configured in accordance with various aspects of the invention, that may be used to provide provider-agnostic serverless functions.

FIG. 10 illustrates a provider-agnostic function handling process 1000 configured in accordance with various aspects of the invention. The provider-agnostic function handling process 1000 provides users the ability create and use the same serverless function definition on multiple, different serverless function providers such as the FaaS providers shown in FIG. 2, including the FaaS provider A 240, the FaaS provider B 250, and the FaaS provider C 260. In other words, a user may only need to write a function definition once and use/reuse that function definition at any FaaS provider without regard to any provider-specific requirements noted above, such as how the serverless function definition is to be submitted, naming conventions and formats, etc.

Figure 11:
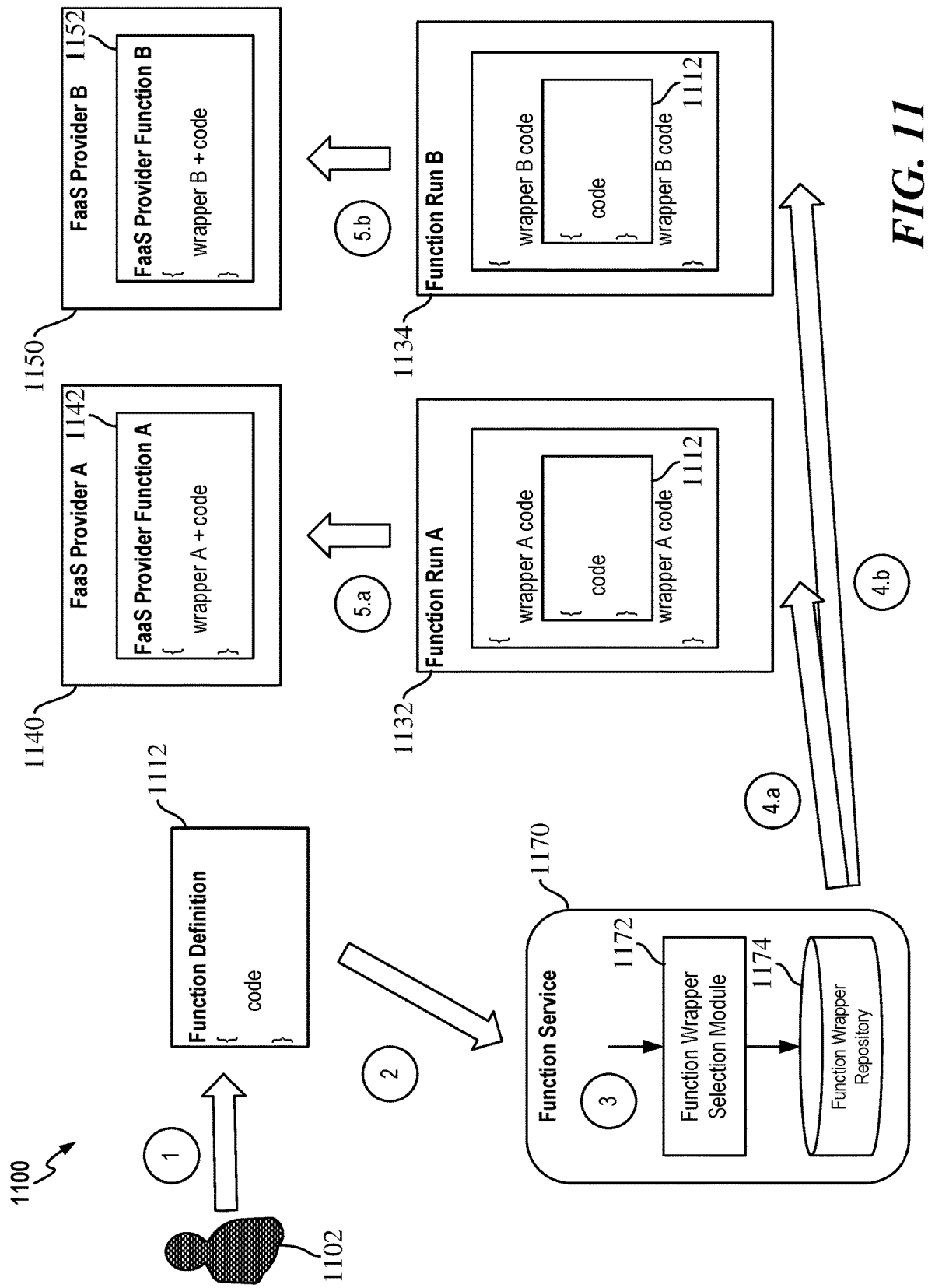
FIG. 11 is a diagram of an example of how a provider-agnostic serverless function may be implemented using the provider-agnostic function handling process of FIG. 10.

In describing FIG. 10, reference will also be made to FIG. 11, which illustrates a provider-agnostic function handling example 1100. In one aspect of the invention, the provider-agnostic function handling process 1000 may be implemented using a function service that may include the features described for the function service 270 from FIG. 2. In the example provided by FIGS. 10 and 11, the function service is represented as a function service 1170 in FIG. 11.

At step 1002, a provider-agnostic function definition 1112 that has been created by a user 1102 is received by the function service 1170. In one aspect of the disclosed approach, users may create function definitions without concern for provider-specific requirements, and thus may focus on the logic and functionality of the code contained therein. For example, if a user is implementing a serverless function to be used as part of an automation workflow to deploy one or more computing resources (e.g., a VM), the user does not have to worry about coding to specific language used by each FaaS-provider.

At step 1004, a request to trigger a function run for the provider-agnostic function definition 1112 may be received by the function service 1170. In one aspect of the disclosed approach, the user may include a variable that suggests or specifically requests a particular FaaS provider at which to execute the function run. In another aspect of the disclosed approach, the user may rely on the function service 1170 to choose a FaaS provider at which to execute the function run. One example of how a FaaS provider may be chosen has been discussed with reference to FIG. 4.

At step 1006, the function service 1170 may package the code that is in the provider-agnostic function definition 1112 for a particular FaaS provider that will be executing the function run. In one aspect of the disclosed approach, the function service 1170 may receive identifying information about a FaaS provider in the form of a unique identifier that has been assigned to each FaaS provider. In addition to receiving this information, the function service 1170 may also retrieve information about the provider-agnostic function definition 1112, such as what programming language was used to code the function definition, as well as any dependencies of that code (e.g., any libraries needed). Based on all retrieved information, the function service 1170 may then use a wrapper selection process performed by a function wrapper selection module 1172 to select an appropriate wrapper from a function wrapper repository 1174 for that particular FaaS provider. The wrapper includes code customized to that particular FaaS provider to ensure the provider-agnostic function definition 1112 may be used to instantiate a provider function at that particular FaaS provider.

In one aspect of the disclosed approach, the wrapper selection may be based on the programming language (e.g., Python) and available FaaS providers that operate using that programming language (e.g., AWS Lambda) and picking a proper wrapper for that pair from a list of predefined wrappers included in the system. For example, a preferred FaaS provider from a list of FaaS providers may be chosen based on the programming language used. Other criteria may be considered in selecting an appropriate wrapper.

At step 1008, a function run is requested by the function service 1170 with the selected FaaS provider using a packaged provider-agnostic function definition. In one aspect of the disclosed approach, the function service 1170 may first package the provider-agnostic function definition 1112 in the wrapper appropriate for the selected FaaS provider and programming language used for the code in the provider-agnostic function definition 1112, as discussed above, before sending the packaged provider-agnostic function definition to the selected FaaS provider along with a request to execute a function run using that provider-agnostic function definition. Two examples are shown in FIG. 11, where a function run has been requested for the provider-agnostic function definition 1112 with both the FaaS provider A 1140 and the FaaS provider B 1150.

Specifically, where the selected FaaS provider is the FaaS provider A 1140, the provider-agnostic function definition 1112 is wrapped with a wrapper retrieved for the FaaS provider A 1140 to create a new function run shown as a function run A 1132. The function run A 1132 includes code, illustrated as "wrapper A code," that is necessary for executing the provider-agnostic function definition 1112 at the FaaS provider A 1140. A FaaS provider function A 1142 is used to illustrate the function run A 1132 being executed at the FaaS provider A 1140.

Continuing to refer to FIG. 11, a similar example is shown for when a function run has been requested for the provider-agnostic function definition 1112 using the FaaS provider B 1152, where a FaaS provider Function B 1152 is used to illustrate a function run B 1134 with the code from the provider-agnostic function definition 1112 being executed at the FaaS provider B 1150. Similar to the function run A 1132, the function run B 1134 also includes code, illustrated as "wrapper B code," that is necessary for executing the provider-agnostic function definition 1112 at the FaaS provider B 1150.

It should be noted that although the wrapper code for a specific FaaS provider (e.g., "wrapper A code" and "wrapper B code") are illustrated as being separate from the code from the provider-agnostic function definition 1112, the actual code being sent to the FaaS provider does not have to include any differentiation. Thus, the FaaS provider may simply receive a function run request with code for execution without being aware a wrapper has been used. In fact, as it should be transparent to the FaaS provider whether a function run is based on a provider-agnostic function definition, this may be preferred.

At step 1010, the function service 1170 receives a provider function identifier from the selected FaaS provider. As described, the provider function identifier allows a status of the provider function to be determined. For example, if the selected FaaS provider is the FaaS provider A 1140, then the function service 1170 will receive a provider function identifier for the FaaS provider function A 1142. Similarly, if the selected FaaS provider is the FaaS provider B 1150, then the function service 1170 will receive a provider function identifier for the FaaS provider function B 1152. In accordance with various aspects of the disclosed approach, more than one identifier may be used in identifying a flow definition, a flow run, a function definition, and a function run. For example, for a provider function at a FaaS provider for which the function service has already received an identifier from the FaaS provider, the function service may still use a separate identifier to internally manage that provider function.

At step 1012, the function service 1170 may request an update from the selected FaaS provider of the status of the provider function. For example, if the selected FaaS provider is the FaaS provider A 1140, then the function service 1170 may request a status update of the FaaS provider function A 1142 using the provider function identifier assigned to the FaaS provider function A 1142. Similarly, if the selected FaaS provider is the FaaS provider B 1150, then the function service 1170 may request a status update of the FaaS provider function B 1152 using the provider function identifier assigned to the FaaS provider function B 1152.

It should be noted that although the function wrapper selection module 1172 is separately illustrated and described as part of a function service such as the function service 1170, the benefits provided by the function wrapper selection module 1172 may be included any function service described herein, such as the function service 270 of FIG. 2. For example, various aspects of the function wrapper selection module 1172 as described herein may be implemented as being a part of the flow model processing engine 272. Thus, one of ordinary skill in the art would understand that the description provided above for the cross-FaaS provider function orchestration by the function service 270 may be applied to serverless functions that are provider-agnostic. Specifically, when the flow model processing engine 272 needs to execute a function run at a FaaS provider for a function definition that is a provider-agnostic provider function definition, the function wrapper selection module 1172 may be used to wrap the provider-agnostic provider function definition to prepare a provider-specific function run.

Figure 12:
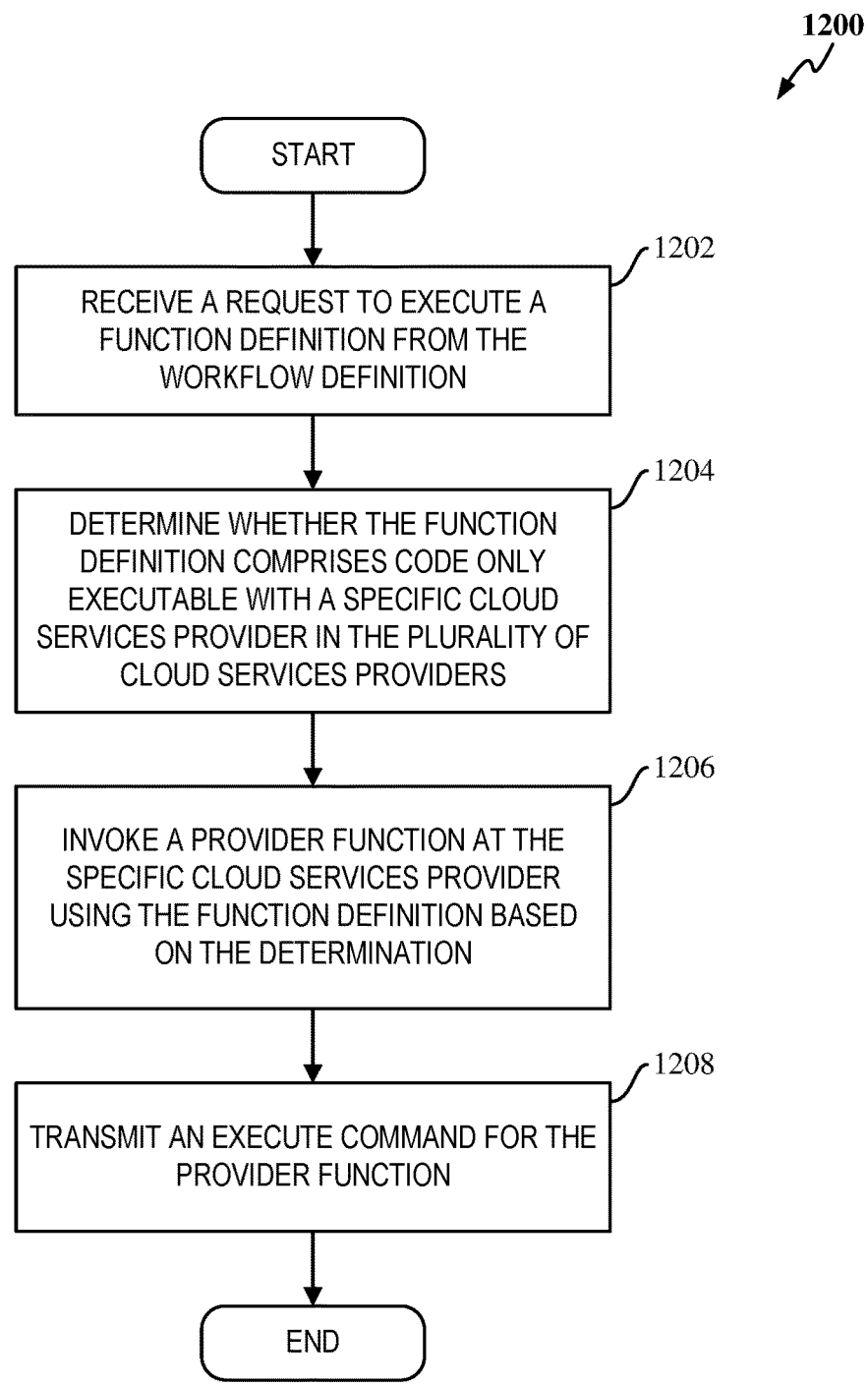
FIG. 12 is a flow diagram of a computer-implemented method, configured in accordance with various aspects of the invention, for orchestrating cross-FaaS provider functions declaratively.

A computer-implemented method in a cloud architecture for executing a workflow definition comprising a set of function definitions having code executable with at least one cloud service provider in a plurality of cloud services providers in accordance with various aspects of the invention is described with reference to a flow diagram 1200 of FIG. 12. At block 1202, a request to execute a function definition from the workflow definition is received. At block 1204, it is determined whether the function definition includes code only executable with a specific cloud services provider in the plurality of cloud services providers. At block 1206, a provider function at the specific cloud services provider using the function definition based on the determination is invoked. At block 1208, an execute command for the provider function is transmitted.

Although the operations of the approaches herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method in a cloud architecture for executing a workflow definition comprising a set of function definitions having code executable with at least one cloud services provider in a plurality of cloud services providers, the method comprising:
   receiving a request to execute a function definition from the workflow definition wherein the function definition specifies data to deploy a particular function in a cloud services provider;
   determining whether the function definition comprises code that is only executable with a specific cloud services provider in the plurality of cloud services providers;
   invoking a provider function at the specific cloud services provider using the function definition based on the determination; and
   transmitting an execute command for the provider function, wherein the provider function executes the code at the specific cloud services provider to deploy the particular function at the specific cloud services provider.

2. The method of claim 1, wherein the function definition further comprises a cloud services provider identifier, and the determining of whether the function definition comprises code that is only executable with-a the specific cloud services provider comprises:
   selecting the specific cloud services provider based on the cloud services provider identifier.

3. The method of claim 1, further comprising
   receiving a request to execute a second function definition from the workflow definition;
   determining whether the second function definition comprises code that is only executable with a second specific cloud services provider in the plurality of cloud services providers; and
   invoking a second provider function at the second specific cloud services provider using the second function definition based on the determination.

4. The method of claim 1, wherein the function definition does not comprise code that is only executable with the specific cloud services provider, the method further comprising:
   selecting one of the plurality of cloud services providers based on a criterion; and
   invoking the provider function at the one of the plurality of cloud services providers.

5. The method of claim 4, wherein the criterion comprises at least one of cost, available resource, cloud services provider selection priority, and external restriction.

6. The method of claim 1, further comprising:
   receiving an identifier to reference the provider function at the specific cloud services provider, wherein the identifier comprises information necessary to determine a status of execution of the provider function; and
   instancing the provider function based on the information.

7. The method of claim 1, further comprising:
   before invoking the provider function at the specific cloud services provider using the function definition, modifying the function definition to add a wrapper comprising customized code for creating the provider function at the specific cloud services provider, wherein the function definition is packaged in the wrapper to deploy the particular function specified in the function definition at the specific cloud services provider.

8. A non-transitory computer-readable storage medium containing program instructions for executing a workflow definition in a cloud architecture, wherein the workflow definition comprising a set of function definitions having code executable with at least one cloud services provider in a plurality of cloud services providers, wherein execution of the program instructions by one or more processors causes the one or more processors to perform steps comprising:
   receiving a request to execute a function definition from the workflow definition wherein the function definition specifies data to deploy a particular function in a cloud services provider;
   determining whether the function definition comprises code that is only executable with a specific cloud services provider in the plurality of cloud services providers;
   invoking a provider function at the specific cloud services provider using the function definition based on the determination; and
   transmitting an execute command for the provider function, wherein the provider function executes the code at the specific cloud services provider to deploy the particular function at the specific cloud services provider.

9. The computer-readable storage medium of claim 8, wherein the function definition further comprises a cloud services provider identifier, and wherein execution of the program instructions by the one or more processors causes the one or more processors to further perform steps comprising:
   selecting the specific cloud services provider based on the cloud services provider identifier.

10. The computer-readable storage medium of claim 8, wherein execution of the program instructions by the one or more processors causes the one or more processors to further perform steps comprising:
   receiving a request to execute a second function definition from the workflow definition;
   determining whether the second function definition comprises code that is only executable with a second specific cloud services provider in the plurality of cloud services providers; and
   invoking a second provider function at the second specific cloud services provider using the second function definition based on the determination.

11. The computer-readable storage medium of claim 8, wherein the function definition does not comprise code that is only executable with the specific cloud services provider, and wherein execution of the program instructions by the one or more processors causes the one or more processors to further perform steps comprising:
    selecting one of the plurality of cloud services providers based on a criterion; and
    invoking the provider function at the one of the plurality of cloud services providers.

12. The computer-readable storage medium of claim 11, wherein the criterion comprises at least one of cost, available resource, cloud services provider selection priority, and external restriction.

13. The computer-readable storage medium of claim 8, wherein execution of the program instructions by the one or more processors causes the one or more processors to further perform steps comprising:
    receiving an identifier to reference the provider function at the specific cloud services provider, wherein the identifier comprises information necessary to determine a status of execution of the provider function; and
    instancing the provider function based on the information.

14. The computer-readable storage medium of claim 8, wherein execution of the program instructions by the one or more processors causes the one or more processors to further perform steps comprising:
    before invoking the provider function at the specific cloud services provider using the function definition, modify the function definition to add a wrapper comprising customized code for creating the provider function at the specific cloud services provider wherein the function definition is packaged in the wrapper to deploy the particular function specified in the function definition at the specific cloud services provider.

15. A system in a cloud architecture for executing a workflow definition in a cloud architecture, wherein the workflow definition comprising a set of function definitions having code executable with at least one cloud services provider in a plurality of cloud services providers, the system comprising:
    memory; and
    one or more processors configured to:
        receive a request to execute a function definition from the workflow definition, wherein the function definition specifies data to deploy a particular function in a cloud services provider;
        determine whether the function definition comprises code that is only executable with a specific cloud services provider in the plurality of cloud services providers;
        invoke a provider function at the specific cloud services provider using the function definition based on the determination; and
        transmit an execute command for the provider function, wherein the provider function executes the code at the specific cloud services provider to deploy the particular function at the specific cloud services provider.

16. The system of claim 15, wherein the function definition further comprises a cloud services provider identifier, and the one or more processors are further configured to:
    select the specific cloud services provider based on the cloud services provider identifier.

17. The system of claim 15, wherein the one or more processors are further configured to:
    receive a request to execute a second function definition from the workflow definition;
    determine whether the second function definition comprises code that is only executable with a second specific cloud services provider in the plurality of cloud services providers; and
    invoke a second provider function at the second specific cloud services provider using the second function definition based on the determination.

18. The system of claim 15, wherein the function definition does not comprise code that is only executable with the specific cloud services provider, and wherein the one or more processors are further configured to:
    select one of the plurality of cloud services providers based on a criterion; and
    invoke the provider function at the one of the plurality of cloud services providers.

19. The system of claim 18, wherein the criterion comprises at least one of cost, available resource, cloud services provider selection priority, and external restriction.

20. The system of claim 15, wherein the one or more processors are further configured to:
    receive an identifier to reference the provider function at the specific cloud services provider, wherein the identifier comprises information necessary to determine a status of execution of the provider function; and
    instance the provider function based on the information.

* * * * *